United States Patent [19]
Adams, Jr. et al.

[11] Patent Number: 5,717,750
[45] Date of Patent: Feb. 10, 1998

[54] METHOD FOR PROHIBITING CONTINUAL ROUTING OF A CALL BETWEEN CENTRAL OFFICE SWITCHES DUE TO TRANSLATION DATA ERROR

[75] Inventors: William Lowell Adams, Jr., Clarendon Hills; Valerie Y. Boyle, Wheaton; Ronald Bruce Martin, Carol Stream; Robert Allen Swanson, Naperville; Douglas Paul Totel, Glen Ellyn; Robert Mark Yacobi, New Lenox, all of Ill.

[73] Assignee: Lucent Technologies Inc., Murray Hill, N.J.

[21] Appl. No.: 529,698

[22] Filed: Sep. 18, 1995

[51] Int. Cl.⁶ .................................................. H04M 7/00
[52] U.S. Cl. .................. 379/213; 379/220; 379/221; 379/229; 379/240; 379/9
[58] Field of Search .................... 379/210, 211, 379/213, 219, 220, 221, 229, 230, 240, 242, 269, 271, 272, 273, 279, 9, 10, 15, 34, 18

[56] References Cited

U.S. PATENT DOCUMENTS

| | | |
|---|---|---|
| 4,021,624 | 5/1977 | Kelly et al. .............................. 379/18 |
| 4,754,479 | 6/1988 | Bicknell et al. ......................... 379/207 |
| 5,018,194 | 5/1991 | Suzuki .................................... 379/207 |
| 5,048,081 | 9/1991 | Gavaras et al. ......................... 379/221 |
| 5,187,732 | 2/1993 | Suzuki ...................................... 379/18 |
| 5,237,604 | 8/1993 | Ryan ...................................... 379/220 |
| 5,255,315 | 10/1993 | Bushnell .............................. 379/221 |
| 5,259,026 | 11/1993 | Johnson ................................ 379/207 |
| 5,440,626 | 8/1995 | Boyle et al. ........................... 379/219 |
| 5,444,773 | 8/1995 | Hirsohn et al. ........................ 379/219 |
| 5,454,034 | 9/1995 | Martin .................................. 379/230 |

Primary Examiner—Krista Zele
Assistant Examiner—Daniel S. Hunter
Attorney, Agent, or Firm—Mony R. Ghose

[57] ABSTRACT

A method for detecting translation data error in a central office switch comprises: receiving a call directed to a ported directory number in a switch; retrieving translation data from the switch memory to connect the call to a customer line; and determining that the call cannot be completed to a customer line served by the switch. Upon determining that the call cannot be connected to a customer line served by the switch, a translation data error (TDE) indicator is set in the switch memory so that the instant call, and all subsequent calls directed to the same ported directory number, are connected to an announcement circuit. An translation data error message is also sent to a central switch maintenance and control center by the switch.

15 Claims, 2 Drawing Sheets

5,717,750

METHOD FOR PROHIBITING CONTINUAL ROUTING OF A CALL BETWEEN CENTRAL OFFICE SWITCHES DUE TO TRANSLATION DATA ERROR

TECHNICAL FIELD

This invention relates to the field of telecommunications systems and, more particularly, to prohibiting the continual routing of a call due to translation data error in a central office switch in such telecommunications systems.

BACKGROUND OF THE INVENTION

Over the past decade, the demand for advanced telecommunications services has increased with population growth and technological innovation. One by-product of this demand is the frequent transfer of customer lines among central office switches. A common catalyst for the transfer of customer lines among switches is the "capping" of a central office switch. Capping is a well-known process initiated when an existing switch approaches its service capacity, and it is anticipated that the switch will be unable to serve the needs of its growing base of customers. The increasing number of users who require additional telephone lines for equipment, such as facsimile machines and personal computers, has contributed to the capping of many central office switches. During the capping process, the growth of a switch is terminated (i.e. the switch is "capped") and additional customer lines are served by a new (usually more technologically advanced) switch. Inevitably, some customers served by the capped switch request service features which are only available to those served by the new switch. Thus, the transfer of individual customer lines served by the capped (or "old") central office switch to a "new" central office switch is common.

Changing switch service of a given customer line from one central office switch to another requires manually retrieving customer line data from the old switch and entering the same data into a new data base in the new switch. If adding a new service feature is the impetus for the transfer, additional data relating to the newly added service feature must also be entered into the customer file data of the new switch. Since each central office switch typically serves one or more "blocks" of directory numbers, wherein each block has a unique office code, the transfer of a customer line from one switch to another normally implies a directory number change. Most customers, however, want to retain their current directory numbers subsequent to a central office switch change-over. The directory numbers that these customers retain are "ported" directory numbers which are defined as telephone numbers having an office code different from the office code of the switch by which the customer line is actually served. To serve customers with ported directory numbers, systems exist which enable a customer line served by one switch to receive telephone calls at a directory number which includes an office code assigned to another switch. An exemplary embodiment of such a system can be found in commonly assigned U.S. Pat. No. 5,048,081 to Gavaras et al. entitled "Arrangement for Routing Packetized Messages", which issued on Sep. 10, 1991 (hereinafter, the Gavaras et al. patent).

During the manual data transfer process in which customer line data from the old switch is retrieved and entered into the memory of the new switch, a service technician must also enter translation data in the new switch so that incoming calls destined for the ported directory number customer may be properly routed. More particularly, translation data is entered so that the new central office switch can convert the ported directory number identifying the transferred customer line into a specific customer line address on the new switch.

A significant problem arises in the prior art, however, if incorrect translation data is entered into the new central office switch or, if translation data has not been entered at all. Normally, calls directed to a dialed directory number corresponding transferred customer line are delivered to the new central office switch in accordance with one of the following call flow scenarios: (1) the incoming call directed to a transferred customer line is routed by the public switched telephone network directly to the new central office switch via a point code converter as described in the Gavaras et al. patent or, as a result of a database query; or, (2) the incoming call is initially routed to the old central office switch which recognizes the call as being directed to a transferred customer line, and subsequently extends the call to the new switch over an inter-switch trunk, as is known in the art. Once the call is received in the new central office switch, the switch attempts to complete the call to a customer line. Call completion implies that the new switch recognizes that the directory number corresponds to a switch customer line address. If the new switch detects incorrect (or non-existent) translation data such that it is unable to complete the call to any of its customer lines, however, the call is routed to the old switch over an inter-switch trunk connection in accordance with the office code digits of the dialed directory number which identify the old switch. Upon receiving the call from the new switch, the old switch recognizes (for the second time, if the call was initially received in the old switch) that the directory number corresponds to a transferred customer line and extends the call back to the new switch over yet another inter-switch trunk connection. The routing back and forth of the call between the old switch and the new switch continues until there are no longer any inter-switch trunks available. When inter-switch trunks are not available, other trunk connections in the network are accessed to route the call between the switches. Eventually, a significant number of network trunks are occupied in the attempt to complete the call.

In addition to failing to make the desired connection, needlessly occupying trunks results in call delays for all other calls in the network. Therefore, there is a need in the art for automatically identifying translation data errors in a central office switch, and for prohibiting the continual routing of a call between central office switches due to translation data error.

SUMMARY OF THE INVENTION

This need is addressed and a technological advance is achieved in the telecommunications art by the method and system of the present invention which enables a central office switch in a telecommunications system to detect the existence of a translation data error, and prohibits continual routing of a call between central office switches.

In the preferred embodiment of the method and system of the present invention, a call directed to ported directory number (i.e. a transferred customer line) is received in a new central office switch. Upon receiving the call, the new central office switch determines whether translation data is required to connect the call to the customer line. Responsive to a decision that translation data is required, the new switch determines whether a translation data error (TDE) indicator has been set for this particular ported directory number indicating that a previous attempt to connect the call to a customer line failed. If no TDE indicator is found, the new switch connects the call to a customer line, or, if the call cannot be connected to a customer line, returns the call to the switch corresponding to the office code digits of the dialed directory number, and sets a TDE indicator. If a TDE indicator has already been set, the call is connected to an announcement circuit in the new central office switch, and routing of the call to the switch corresponding to the office code digits of the dialed directory number (i.e. the old switch) is prohibited. The TDE indicator is set by the new switch as a result of an unsuccessful attempt by the switch to connect an incoming call to a customer line on the switch and thereby, prevents fruitless re-routing of the call between the old switch and the new switch. Subsequent to setting the TDE indicator, the new central office switch also transmits an error message to a central switch maintenance and control center so that service personnel may be alerted of the existence of translation data error.

DETAILED DESCRIPTION

Figure 1:
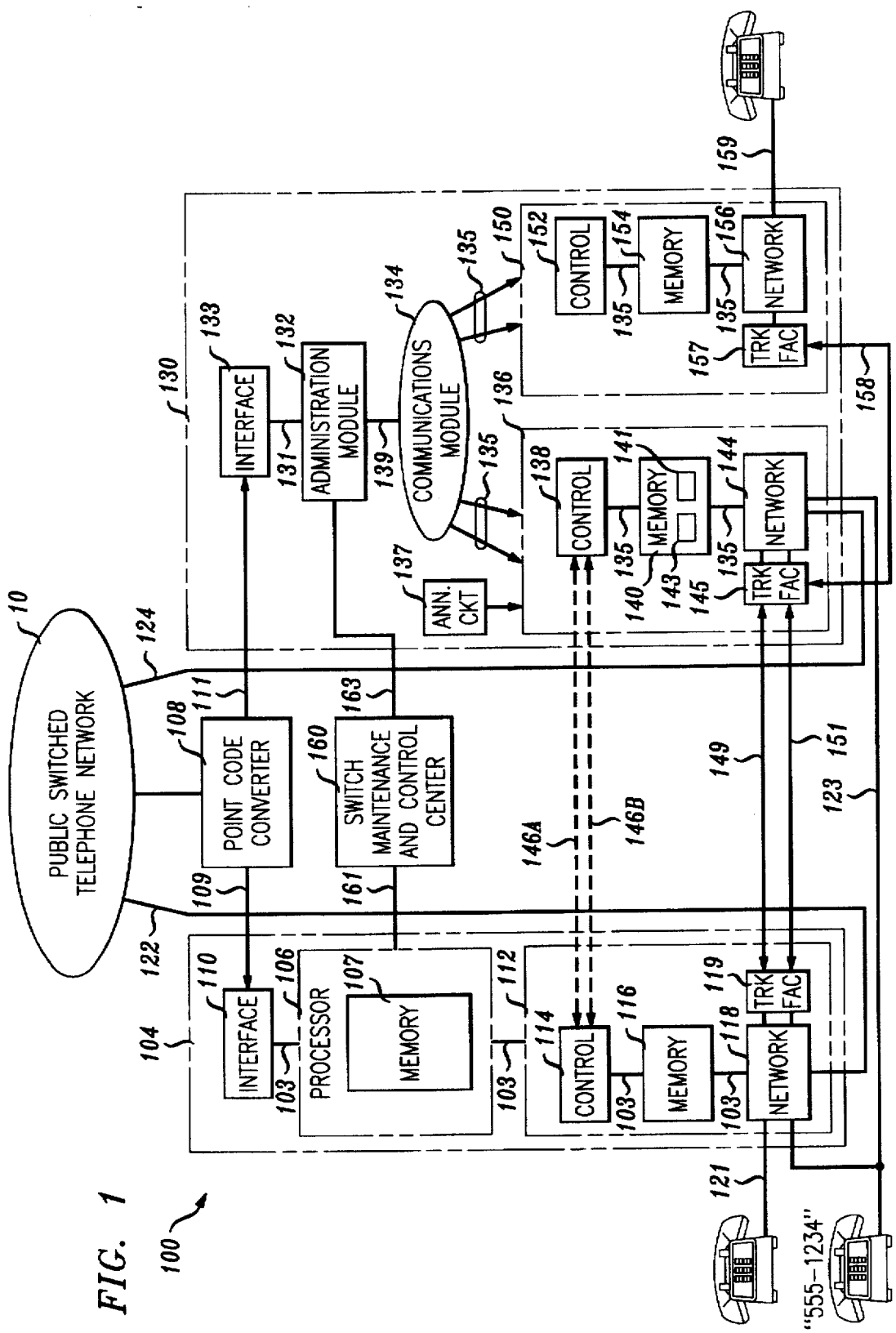
FIG. 1 is a simplified block diagram of a telecommunications system in which the present invention may be practiced.

FIG. 1 shows telecommunications system 100 comprising first central office switch 104 (the "old" switch) and second central office switch 130 (the "new" switch). Also shown is point code converter 108 which is used to route calls from public-switched telephone network (PSTN) 10 to telecommunications system 100, as described in the Gavaras et al. patent. Alternative embodiments of the present invention may not employ a point code converter.

First central office switch 104 is identified by office code digits "555" and includes: main processor 106 for administering global maintenance and control functions; main switch memory 107 for storing system-wide data; interface 110 for receiving messages from point code converter 108 via signaling link 109; and switch module (SM) 112 for serving as an interface to customer lines and PSTN 10 (via trunk 122). SM 112 comprises controller 114, memory 116, network unit 118 and trunk facility 119. All internal switch components are inter-connected by data links 103. In this embodiment, a single switch module serving a single customer, via customer line 121, is shown for clarity. An operational central office switch includes multiple switch modules and serves many more customers.

In a preferred embodiment of the present invention, second central office switch 130 is the 5ESS digital switch manufactured and sold by AT&T. New switch 130 is identified by office code digits "777" and includes three major components: administrative module (AM) 132; communications module (CM) 134 and switch modules (SM) 136 and 150. AM 132 is responsible for administering global maintenance and control functions, and is inter-connected to interface unit 133 via data link 139. Interface unit 133 receives messages from point code converter 108 over signaling link 111. CM 134 serves as communications conduit between AM 132 and the switch modules. Communication among the various components within second central office switch 130 (with the exception of the connection between AM 132 and interface unit 133) is accomplished via network control and timing (NCT) links 135. As convention dictates, dual NCT links are shown between the switch modules (SM 136 and SM 150) and CM 134.

SM 136 comprises controller 138 for module control, memory 140 for storing information including translation data 141 and translation data error (TDE) indicator 143, network element 144 for interfacing with customer lines and trunk facility 145 for coordinating trunk connections with other switches. Also shown are signaling links 146A and 146B between controller 138 of SM 136 and controller 114 of SM 112. As known in the art, messages between SM 136 and SM 112 are issued over a signaling link for establishing trunk connections between switches. In this embodiment, first trunk connection 149 and second trunk connection 151 have been established between trunk facilities 119 and 145 in accordance with well-established procedures. There are a predetermined number of trunk connections available between old switch module 112 and new switch module 136. Thus, if all trunks between old switch 104 and new switch 130 are seized at any given time, pending calls which require a connection between the switches cannot be completed until a trunk becomes available. The continual re-routing of a call due to translation data error in a switch (which occurs in the prior art as described above) potentially results in use of all of the trunks between switches, such as old switch 104 and new switch 130, such that other calls which require routing between the switches cannot be completed in a timely manner. SM 136 which serves customer line 123 identified by the directory number "(708) 555-1234", and previously served by SM 112 of switch 104, is connected to PSTN 10 via trunk 124. SM 150 comprises controller 152, memory 154 and network element 156 which includes trunk facility 157. SM 150 communicates with SM 136 via CM 134 but is also shown in FIG. 1 as having an established bi-directional trunk connection 158 between its trunk facility 157 and trunk facility 145 of SM 136. In this embodiment, SM 150 serves a single customer via customer line 159.

Central switch maintenance and control center (MCC) 160 monitors all central office switches in telecommunications system 100. MCC 160 is interconnected to main processor 106 of old switch 104 and AM 132 of new switch 130 via data links 161 and 163, respectively. In alternative embodiments, MCC 160 may also be inter-connected to each switch module in telecommunications system 100.

Figure 2:
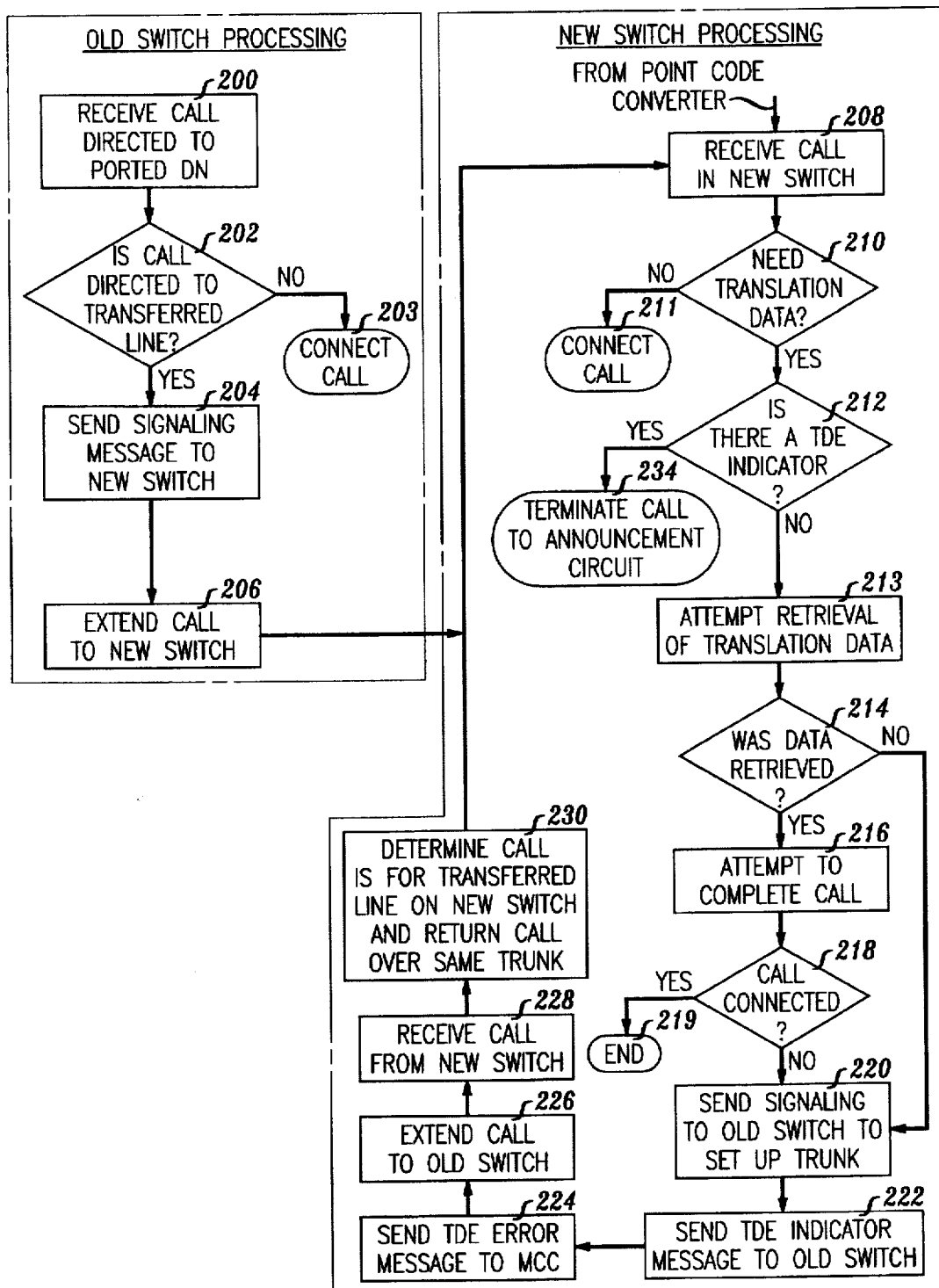
FIG. 2 is a flow diagram of the steps performed in the telecommunications system of FIG. 1 in accordance with a preferred embodiment of the method of the present invention.

FIG. 2 is a flow diagram of the steps performed by new switch 130 for identifying translation data error, and for prohibiting the continual routing of a call in accordance with a preferred embodiment of the method of the present invention. For purposes of example, assume that a caller served by a central office switch in another telecommunications system (not shown) places a call to a called party served by transferred customer line 123 on new central office switch 130 by dialing the called party's ported directory number "708-555-1234". Also assume that no previous calls directed to the transferred customer line have been received in the new switch. In one preferred embodiment, the process begins in step 200 when the call is received in the called party's old switch (i.e. first central office switch 104) from PSTN 10 via trunk 122.

In decision step 202, old switch 104 determines whether the call is directed to a transferred customer line. If the outcome of decision step 202 is a "NO" determination, the call is completed to customer line on the old switch in step 203. If, as in this example, the outcome of decision step 202 is a "YES" determination, the process continues to step 204 in which old switch 104 sends a message to new switch 130 over signaling link 146A to seize a trunk connection to the new switch which now serves the transferred customer line. In step 206, old switch 104 extends the call over seized trunk connection 149 which was established as a result of the signaling in the previous step. In step 208, new switch 130 receives the call. In an alternative embodiment, the incoming call is not delivered to the switch corresponding to the office code digits "555" of the dialed directory number (i.e. old switch 104) but, instead, is extended by PSTN 10, via point code converter 108, directly to new switch 130 (in either embodiment, the call arrives at the new switch in step 208).

Regardless of whether the incoming call was received via old switch 104 or PSTN 10, in decision step 210, new switch 130 determines whether translation data is needed to complete the call to a customer line. A call is completed when a switch detects an appearance of a customer line associated with the dialed directory number of the call. Customer premises equipment need not necessarily be associated with the customer line. Also, once the call is completed to a customer line, other features, such as call forwarding, may further route the call. If the outcome of decision step 210 is a "NO" decision, the call is connected to a customer line in step 211. If, however, the outcome of decision step 210 is a "YES" decision, the process continue to decision step 212 in which it is determined whether there is a TDE indicator associated with dialed directory number. If the outcome decisions step is a "YES" decision, the process continues to step 234 in which new switch 130 terminates the call to an announcement circuit 137 and releases trunk connection 151 over which the call was extended. If, as is in this case, the outcome of decision step 212 is a "NO" decision, the process continues to step 213 where an attempt is made to retrieve translation data from SM memory 140 of new switch 130.

In decision step 214, a determination is made as to whether translation data was actually retrieved from SM 140. If the outcome of decision step 214 is a "NO" decision, the process continues to step 220 in which new switch 130 sends a signaling message to old switch 104 (the switch is identified by the office code digits of the dialed directory number) over signaling link 146B to set up a trunk connection so that the call may be returned to old switch 104 in the event that the call was inadvertently extended to the new switch. If the outcome of decision step 214 is a "YES" decision, however, the process continues to step 216 where an attempt to complete the call to a customer line on switch 130 is made by searching for an appearance of the customer line address specified in the translation data. In decision step 218, a determination is made as to whether the call was actually completed to a customer line in the previous step. If the outcome of decision step 218 is a "YES" decision, the process ends in step 219. If, however, the outcome of decision step 218 is a "NO" decision, the process returns to step 220.

In step 222, new switch 130 sends an indicator over signaling link 146B to old switch 104 indicating that translation data error was found and that the seized trunk should remain connected until released by new switch 130. Simultaneously, in step 224, new switch 130 sets a TDE indicator in switch memory 140 signifying that there is translation data error associated with the dialed directory number, and that future calls received over any trunk connection for that particular directory number should be terminated to an announcement circuit 137 which informs the caller that the call cannot be completed. In step 224, new switch 130 sends an error message to MCC 160 over data link 163 indicating that a TDE indicator has been set for that particular dialed directory number. Eventually, when the error has been corrected, MCC 160 sends a "erase TDE indicator" message to new switch 130 via data link 163 so that future calls are not routed to the announcement circuit. The process continues to step 226 in which bi-directional trunk connection 151 is established between trunk facilities 119 and 145 of old switch 104 and new switch 130, respectively, and the call is extended back to old switch 104 over the connection. Even though translation data error was found in new switch 130, the call is extended back to old switch 104 in case the call was initially inadvertently delivered to the new switch. In step 228, old switch 104 receives the call via trunk connection 151. In step 230, old switch 104 determines that the call is directed to a transferred customer line, and returns the call to new switch 130 over bi-directional trunk connection 151.

In this manner, erroneous translation data maintained in a central office switch does not result in the continual routing of a call between "old" and "new" central office switches in a telecommunications system. Continual routing of the call is prohibited because the new switch terminates the call to an announcement circuit upon identification of the translation data error. Further, a central switch maintenance and control center is automatically alerted by the new central office switch when translation data error is detected so that, hopefully, the error is corrected before a customer complaint is filed.

It is to be understood that the above-described embodiments are for illustrative purposes only. Numerous other arrangements of the invention may be devised by those skilled in the art without departing from the scope of the invention.

The invention claimed is:

1. In a telecommunications system comprising a plurality of central office switches, wherein a given directory number has been ported from a first of the plurality of switches to a second of the plurality of switches, a method for detecting translation data errors in the second switch comprise the steps of:

receiving a call directed to the ported directory number in the second switch;

the second switch retrieving translation data to connect the call to a customer line served by the second switch;

determining whether the call can be connected to a customer line served by the second switch;

storing a translation data error (TDE) indicator associated with the ported directory number in the second switch responsive to the determination that the call cannot be connected to a customer line served by the second switch;

extending the call to the first switch; and completing any subsequent calls directed to the ported directory number in the second switch in response to the presence of the TDE indicator.

2. The method of claim 1 wherein the step of receiving a call directed to the ported directory number comprises:

receiving the call in the second switch from the first switch.

3. The method of claim 1 wherein storing a TDE indicator responsive to determining that the call cannot be connected to a customer line served by the second switch comprises the step of:

determining that translation data corresponding to the ported directory number does not exist.

4. The method of claim 1 wherein terminating any subsequent calls directed to the ported directory number comprises the step of:

connecting the call to an announcement circuit in the second switch.

5. The method of claim 1 and further comprising the second switch sending an error message to a switch maintenance and control center upon setting a TDE indicator.

6. The method of claim 1 wherein the step of receiving a call directed to the ported directory number in the second switch comprises the step of:

receiving the call directly from a public-switched telephone network.

7. The method of claim 1 and further comprising routing the call to the first switch upon receiving the call in the second switch for a second time.

8. In a telecommunications system comprising a plurality of central office switches maintained by a central switch maintenance and control center, a method for identifying translation data error in at least one switch comprises the steps of:

receiving a call directed to a first directory number in a switch;

retrieving translation data stored in the switch to complete the call to a customer line served by the switch;

determining that the call cannot be completed to a customer line served by the switch; and the switch sending a translation data error message to the central switch maintenance and control center.

9. The method of claim 8 wherein the step of receiving a call directed to a first directory number in the switch comprises the step of:

receiving the call from another switch over an inter-switch trunk.

10. The method of claim 8 wherein the step of retrieving translation data stored in the switch comprises the steps of:

determining that translation data is needed to connect the call to a customer line; and retrieving translation data stored in the switch memory.

11. The method of claim 8 wherein the switch sending a translation data error message to the central switch maintenance and control center comprises the step of:

determining that translation data corresponding to the first directory number does not exist.

12. The method of claim 8 and further comprising the switch connecting all subsequent calls directed to the first directory number to an announcement circuit.

13. The method of claim 8 and further comprising the switch receiving a message from the central switch maintenance and control center.

14. In a telecommunications system comprising a plurality of central office switches wherein each switch maintains a plurality of customer lines and a customer line has been ported from a first switch to a second switch, a method for prohibiting continual routing of a call directed to the transferred customer line between the first switch and the second switch comprises:

receiving a call in the second switch, wherein the call was received from the first switch over a first inter-switch trunk;

the second switch retrieving translation data associated with a directory number of the transferred customer line;

the second switch determining that there is translation data error (TDE) associated with the directory number;

setting a TDE indicator associated with the directory number in the second switch upon determining that translation data error exists; and connecting the call to an announcement circuit in the second switch upon receiving the call from the first switch over a second inter-switch trunk.

15. A telecommunications system comprising:

a first central office switch including a switch module comprising a controller, memory and a first trunk facility;

a second central office switch which may be interconnected to the first central office switch via a second trunk facility;

means for establishing trunk connections between the first central office switch and the second central office switch via the first trunk facility and the second trunk facility;

means for storing translation data in the second central office switch corresponding to a customer line address on the first central office switch;

means for setting a translation data error (TDE) indicator in the second central office switch responsive to the identification of translation data error in the second central office switch; and means for forwarding a translation data error message to a switch maintenance and control center from the first central office switch.

* * * * *